United States Patent [19]

Blinne et al.

[11] 4,200,728

[45] Apr. 29, 1980

[54] MANUFACTURE OF POLYETHERS FROM BIS-(4-HYDROXYPHENYL)-SULFONE AND BIS-(4-CHLOROPHENYL)-SULFONE IN N-METHYLPYRROLIDONE USING AN ALKALI METAL CARBONATE AS CATALYSTS

[75] Inventors: Gerd Blinne, Bobenheim; Claus Cordes, Weisenheim, both of Fed. Rep. of Germany

[73] Assignee: BASF Aktiengesellschaft, Fed. Rep. of Germany

[21] Appl. No.: 912,176

[22] Filed: Jun. 5, 1978

[30] Foreign Application Priority Data

Jul. 14, 1977 [DE] Fed. Rep. of Germany ....... 2731816

[51] Int. Cl.$^2$ ............................................. C08G 65/40
[52] U.S. Cl. ...................................................... 528/174
[58] Field of Search ......................................... 528/174

[56] References Cited

U.S. PATENT DOCUMENTS

| | | | |
|---|---|---|---|
| 3,951,918 | 4/1976 | Jones | 528/175 |
| 3,957,665 | 5/1976 | Jones | 528/175 |
| 3,983,300 | 9/1976 | Jones | 528/175 |
| 4,008,203 | 2/1977 | Jones | 528/175 |
| 4,008,204 | 2/1977 | Jones | 528/175 |
| 4,008,205 | 2/1977 | Jones | 528/175 |
| 4,105,635 | 8/1978 | Freeman | 528/174 |
| 4,105,636 | 8/1978 | Taylor | 528/174 |

FOREIGN PATENT DOCUMENTS

| | | | |
|---|---|---|---|
| 847963 | 7/1970 | Canada | 528/174 |
| 1087234 | 10/1967 | United Kingdom | 528/174 |
| 1264900 | 2/1972 | United Kingdom | 528/174 |
| 1396990 | 6/1975 | United Kingdom | 528/174 |
| 1492366 | 11/1977 | United Kingdom | 528/174 |

*Primary Examiner*—Lester L. Lee
*Attorney, Agent, or Firm*—Keil & Witherspoon

[57] ABSTRACT

Polyethers, preferably containing sulfone groups, are obtained by a multi-stage condensation process at from 100° to 230° C. from substantially equivalent amounts of bis-(4-hydroxyphenyl)-sulfone and a dichlorobenzene compound in a polar aprotic solvent in the presence of an anhydrous alkali metal carbonate, with or without the addition of a compound which forms an azeotrope.

5 Claims, No Drawings

MANUFACTURE OF POLYETHERS FROM BIS-(4-HYDROXYPHENYL)-SULFONE AND BIS-(4-CHLOROPHENYL)-SULFONE IN N-METHYLPYRROLIDONE USING AN ALKALI METAL CARBONATE AS CATALYSTS

The present invention relates to a process for the manufacture of polyethers, especially of polyethers containing sulfone groups.

Polymers containing sulfone groups and ether groups have been disclosed.

According to British Pat. No. 1,078,234 and U.S. Pat. Nos. 3,951,918, 3,957,665, 3,983,300, 4,008,203, 4,008,204 and 4,008,205, polysulfone-ethers are preferably manufactured by reacting aromatic alkali metal phenolates with aromatic halogen compounds. An aqueous solution of an alkaline metal hydroxide is added when producing the alkali metal salt. In this reaction, exactly stoichiometric amounts must be employed, since an excess or deficiency of the base results in an unsatisfactory molecular weight. Furthermore, because of the water which is present, large agglomerates of the phenolate are frequently formed, and these can interfere markedly with the polycondensation.

British Pat. No. 1,264,900 and Canadian Pat. No. 847,963 partially overcome the above disadvantages by using an anhydrous alkali metal carbonate. However, according to British Pat. No. 1,264,900, the small amounts of water formed during decomposition of the alkali metal bicarbonate formed in situ are not removed. As a result, the molecular weights obtained are too low, and the process can only be carried out with a few selected monomers. In Canadian Pat. No. 847,963, this disadvantage is avoided by using a solvent which is distilled off azeotropically together with water. However, in this process relatively high temperatures are used in order to achieve satisfactory molecular weights, and these temperatures result in products exhibiting substantial discoloration. Furthermore the process is restricted to a few high-boiling solvents.

We have found, surprisingly, that polyethers having a good intrinsic color and a high molecular weight are obtained at lower reaction temperatures if substantially equivalent amounts of bis-(4-hydroxyphenyl)sulfone and of a dichlorobenzene compound are reacted stepwise in a polar aprotic solvent in the presence of an anhydrous alkali metal carbonate.

Accordingly, the present invention relates to a process for the manufacture of polyethers by reacting substantially equivalent amounts of bis-(4-hydroxyphenyl)-sulfone with a dichlorobenzene compound or a mixture of several dichlorobenzene compounds in a polar aprotic solvent in the presence of an anhydrous alkali metal carbonate, wherein (a) in a first stage of the reaction, a solution of one mole of bis-(4-hydroxyphenyl)-sulfone is reacted with about one mole of the dichlorobenzene compound in the presence of from 1 to 2, preferably from 1.0 to 1.2, moles of an anhydrous alkali metal carbonate and in the presence of a compound which forms an azeotrope with water, at an average temperature of from 100° C. to 170° C., preferably from 120° C. to 150° C., until at least 90% of the amount of water which can theoretically be formed has been removed, (b) in a second stage of the reaction, further amounts of the compound which forms an azeotrope are added to the reaction mixture while raising the temperature to an average temperature of from 150° C. to 230° C., preferably from 170° C. to 200° C., and at the same time the azeotropic mixture formed is distilled off, until the reaction mixture is completely anhydrous, (c) in a third stage of the reaction, the reaction mixture is polycondensed at an average temperature of from 150° C. to 230° C., preferably from 170° C. to 200° C., until its reduced viscosity is from 0.4 to 1.5 and the polymerization is then stopped by adding methyl chloride and (d) the polyether formed is separated from the solvents and inorganic constituents by conventional methods.

Suitable dichlorobenzene compounds are derivatives of the general formulae

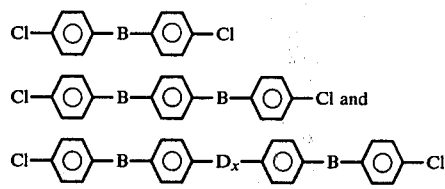

where B is —CO— or —SO$_2$—, D is —O— or —S— and x is 0 or 1.

Examples of such dichlorobenzene compounds are bis-(4-chlorophenyl)-sulfone, bis-(4-chlorophenyl)-ketone, 1,4-bis-(4-chlorobenzoyl)-benzene, 1,4-bis-(4-chlorobenzenesulfonyl)-benzene, 4,4'-bis-(4-chlorobenzoyl)-diphenyl ether, 4,4'-bis-(4-chlorobenzoyl)-diphenyl sulfide, 4,4'-bis-(4-chlorobenzoyl)-diphenyl, 4,4'-bis-(4-chlorobenzenesulfonyl)-diphenyl ether, 4,4'-bis-(4-chlorobenzenesulfonyl)-diphenyl sulfide and 4,4'-bis-(4-chlorobenzenesulfonyl)-diphenyl. The dichlorobenzene compounds may also be used separately or as mixtures. The use of bis-(4-chlorophenyl)-sulfone is preferred.

The polar aprotic solvents used include the N-substituted acid amides, the sulfoxides and the sulfones, for example N,N'-dimethylformamide, N,N-dimethylacetamide, N-methylpyrrolidone, dimethylsulfoxide, dimethylsulfone, tetramethylenesulfone (sulfolan) and diphenylsulfone. The use of N-methylpyrrolidone is preferred.

The amount of polar aprotic solvent used is generally from 5 to 100 moles, preferably from 10 to 20 moles, per mole of bisphenol or of dichlorobenzene compound. This means that in the absence of an alkali metal carbonate and of a compound which forms an azeotrope, the reaction solutions generally have a solids content of from 5 to 50% by weight, preferably from 20 to 35% by weight, based on the total weight.

Examples of suitable anhydrous alkali metal carbonates are sodium carbonate and preferably potassium carbonate. To neutralize the hydrogen chloride formed during the polycondensation, from 1 to 2, preferably from 1.0 to 1.2, moles of anhydrous alkali metal carbonate are employed per mole of bisphenol and of dichlorobenzene compound.

Suitable compounds which form an azeotrope with water are all substances which have a boiling point, at atmospheric pressure, of the order of the reaction temperature, and are homogeneously miscible with the reaction mixture without undergoing a chemical reaction. Examples of the said type are chlorobenzene, toluene and xylene. The use of chlorobenzene is preferred.

The compounds which form an azeotrope are employed in such amounts as to ensure quantitative removal of the water formed during neutralization of the hydrogen chloride by the alkali metal carbonate.

Since the removal of the water may be carried out in conventional equipment, for example in a water separator, and the compound which forms the azeotrope may or may not be recycled continuously, the required amount of the said compound also depends on the nature and size of the equipment. The required amount can however easily be determined experimentally.

Where the compound which forms an azeotrope is not recycled, it has proved advantageous to use from about 2 to 10 moles of the said compound per mole of alkali metal carbonate in the first stage of the reaction.

The process according to the invention is preferably used for polycondensing about 1 mole of bis-(4-hydroxyphenyl)-sulfone with about 1 mole of bis-(4-chlorophenyl)-sulfone in N-methylpyrrolidone as the aprotic solvent in the presence of from 1.0 to 1.2 moles of anhydrous potassium carbonate and of chlorobenzene as the compound which forms an azeotrope with water, to give polyethers.

To carry out the process according to the invention, the reaction mixture is heated in the first stage of the reaction until at least 90% by weight, preferably from 90 to 99, and more preferably from 90 to 96% by weight, of the amount of water which can theoretically be formed has been removed; advantageously, the batch is heated for from 0.5 to 4 hours, preferably from 1 to 2 hours.

In the second stage of the reaction, the mixture is polycondensed until it is completely anhydrous, and for this purpose, further amounts, preferably another 10 to 100%, of the compound which forms an azeotrope are added continuously to the reaction mixture and at the same time the azeotropic mixture formed is distilled off. The reaction time is generally from about 0.5 to 4 hours, preferably from 1 to 2 hours.

Between the first and second stages of the reaction the average temperature is raised by at least 10° C., preferably by at least 20° C., although it is possible to raise the temperature continuously from the beginning of the first to the end of the second stage.

In the third stage, the reaction time required to take the polycondensation to the point where the reduced viscosity of the polyether is from 0.4 to 1.5, preferably from 0.50 to 1.2, is generally from about 3 to 12 hours, preferably from 4 to 8 hours. The polycondensation is then stopped by passing methyl chloride into the mixture. The reaction time required for this is generally from about 0.1 to 2, preferably from 0.2 to 0.5, hour.

The isolation of the polyether in the fourth stage can be carried out in various ways. The solid polymer can be separated out by mixing the reaction solution with a precipitant, for example water and/or methanol, by vigorous stirring, spraying or atomizing. Alternatively, the solvent can be evaporated. The inorganic constituents can be removed from the polyether solution by suitable methods, e.g. dissolving, filtering or sieving.

The polyethers manufactured by means of the process according to the invention have reduced viscosities (measured in a 1% strength solution in sulfuric acid at 24° C.) of from 0.4 to 1.5. This corresponds to a molecular weight of from 15,000 to 120,000. The polyethers obtained are outstandingly suitable for the production of moldings, fibers, films, adhesives and coating compositions.

The Examples and Comparative Examples which follow illustrate the invention. Parts are by weight. The reduced viscosities ($\eta_{red}$) were measured in 1% strength solution in sulfuric acid at 24° C. and calculated from the equation $$\eta_{red} = \eta_{spec}/C$$

The color of the polyethers was assessed by UV measurement on 1% strength solutions in sulfuric acid. The light absorption of the solution in the region from 400 to 800 μm was measured at intervals of 50 μm and the average absorption was calculated therefrom.

EXAMPLE 1

150.2 parts of bis-(4-hydroxyphenyl)-sulfone and 172.3 parts of bis-(4-chlorophenyl)-sulfone are dissolved in 900 parts of N-methyl-pyrrolidone and 300 parts of chlorobenzene and 87.2 parts of anhydrous potassium carbonate are added. The reaction mixture is heated to 150° C. in the course of two hours, whilst continuously distilling off a mixture of water and chlorobenzene. After 93% of the water which theoretically can be formed has been distilled off, the temperature is raised to 180° C. A further 300 parts of chlorobenzene are added dropwise in the course of the next two hours; this chlorobenzene immediately distils off azeotropically. Thereafter, the reaction mixture, which is now completely anhydrous, is kept at 180° C. for 6 hours, until the reduced viscosity reaches 0.6. The polycondensation is stopped by passing a stream of methyl chloride through the mixture for 30 minutes. After adding 600 ml of chlorobenzene, the inorganic constituents are filtered off, and the polymer is precipitated in water and dried for 12 hours at 80° C. under reduced pressure. It has a reduced viscosity $\eta_{red}$ of 0.60 and an average light absorption of 3.4%.

EXAMPLE 2

The procedure described in Example 1 is followed but instead of the potassium carbonate 66.8 parts of anhydrous sodium carbonate are used; a polyether having a reduced viscosity of $\eta_{red} = 0.45$ and an average light absorption of 3.7% is obtained.

COMPARATIVE EXAMPLE A

The polycondensation is carried out as described in Example 1, but in the absence of chlorobenzene. The polyether obtained has a reduced viscosity $\eta_{red}$ of 0.25, and an average light absorption of 6.1%.

COMPARATIVE EXAMPLE B

The polycondensation is carried out as described in Example 1, but using 900 parts of tetramethylenesulfone instead of N-methyl-pyrrolidone as the solvent. Furthermore, in the third stage of the reaction, the mixture is polycondensed for 6 hours at 235° C. The polymer obtained has a reduced viscosity of $\eta_{red}$ of 0.50 and an average light absorption of 14.5%.

COMPARATIVE EXAMPLE C

The procedure followed is as described in Example 1, but all the chlorobenzene (600 parts) is added to the reaction mixture at the start of the polycondensation, and the reaction is completed at 180° C., whilst azeotropic distillation is proceeding. An oligomer having a reduced viscosity $\eta_{red}$ of 0.10 and an average absorption of 5.8% is obtained.

EXAMPLE 3

150.2 parts of bis-(4-hydroxyphenyl)-sulfone and 268.2 parts of 4,4'-bis-(4-chlorobenzoyl)-diphenyl ether are dissolved in 900 parts of tetramethylenesulfone and 300 parts of chlorobenzene and 87.2 parts of anhydrous potassium carbonate are added. Thereafter the procedure described in Example 1 is followed, except that in the third stage of the reaction the mixture is kept at 200° C. for 12 hours. After working up, a polymer having a reduced viscosity $\eta_{red}$ of 0.40 is obtained.

We claim:

1. A process for the manufacture of polyethers by reacting substantially equivalent amounts of bis-(4-hydroxyphenyl)-sulfone with bis-(4-chlorophenyl)-sulfone in the solvent N-methylpyrrolidone in the presence of an anhydrous alkali metal carbonate, wherein
   (a) in a first stage of the reaction a solution of one mole of bis-(4-hydroxyphenyl)-sulfone is reacted with about one mole of bis-(4-chlorophenyl)-sulfone in the presence of from 1 to 2 moles of an anhydrous alkali metal carbonate and in the presence of a compound which forms an azeotrope with water, at an average temperature of from 100° C. to 170° C., until at least 90% of the amount of water which can theoretically be formed has been removed,
   (b) in a second stage of the reaction, further amounts of the compound which forms an azeotrope are added to the reaction mixture while raising the temperature to an average temperature of from 150° C. to 230° C., and at the same time the azeotropic mixture formed is distilled off, until the reaction mixture is completely anhydrous,
   (c) in a third stage of the reaction, the reaction mixture is polycondensed at an average temperature of from 150° C. to 230° C. until its reduced viscosity is from 0.4 to 1.5 and the polymerization is then stopped by adding methyl chloride and
   (d) the polyether formed is separated from the solvents and inorganic constituents.

2. The process of claim 1, wherein the anhydrous alkali metal carbonate used is potassium carbonate and the compound used to form an azeotrope with water is chlorobenzene.

3. The process of claim 1, wherein, in four reaction stages, about 1 mole of bis-(4-hydroxyphenyl)-sulfone is reacted with about 1 mole of bis-(4-chlorophenyl)-sulfone in N-methylpyrrolidone in the presence of from 1.0 to 1.2 moles of anhydrous potassium carbonate, and in the presence of chlorobenzene as the compound which forms an azeotrope, to give a polyether.

4. The process of claim 1, wherein between the first and second stages of the reaction the temperature is raised by at least 10° C.

5. The process of claim 1, wherein the average temperature in both the second stage of the reaction and the third stage of the reaction is from 170° C. to 200° C.

* * * * *